(12) United States Patent
Partanen

(10) Patent No.: US 11,237,527 B2
(45) Date of Patent: Feb. 1, 2022

(54) PARAMETER MODIFICATION

(71) Applicant: Rovio Entertainment Ltd, Espoo (FI)

(72) Inventor: Jyri Partanen, Espoo (FI)

(73) Assignee: ROVIO ENTERTAINMENT LTD, Espoo (FI)

(*) Notice: Subject to any disclaimer, the term of this patent is extended or adjusted under 35 U.S.C. 154(b) by 697 days.

(21) Appl. No.: 14/254,929

(22) Filed: Apr. 17, 2014

(65) Prior Publication Data

US 2015/0301508 A1  Oct. 22, 2015

(51) Int. Cl.
*G05B 13/02* (2006.01)

(52) U.S. Cl.
CPC .................. *G05B 13/024* (2013.01)

(58) Field of Classification Search
CPC .............................. G05B 13/024; H04L 67/10
USPC .......................................................... 700/278
See application file for complete search history.

(56) References Cited

U.S. PATENT DOCUMENTS

| | | | | |
|---|---|---|---|---|
| 5,681,400 A * | 10/1997 | Brady | ................. | A47L 15/0055 134/18 |
| 5,774,761 A * | 6/1998 | Rai | ................. | G03G 15/0855 399/38 |
| 6,564,194 B1 * | 5/2003 | Koza | ................. | G05B 11/42 706/13 |
| 7,003,379 B2 * | 2/2006 | Tanaka | ................. | G05B 13/024 700/278 |
| 7,024,345 B1 * | 4/2006 | Stamm | ................. | G06F 17/5022 703/14 |
| 7,359,898 B1 * | 4/2008 | Acton | ................. | G06F 16/24578 |
| 8,825,513 B1 * | 9/2014 | Misra | ................. | G06Q 10/0635 705/7.28 |
| 9,525,582 B1 * | 12/2016 | Mohr | ................. | H04L 29/06 |
| 10,380,612 B1 * | 8/2019 | Sinnott | ................. | G06F 8/61 |
| 2003/0208284 A1 * | 11/2003 | Stewart | ................. | G05B 13/024 700/30 |
| 2004/0030414 A1 | 2/2004 | Koza et al. | | |
| 2005/0096777 A1 | 5/2005 | Allan et al. | | |

(Continued)

FOREIGN PATENT DOCUMENTS

| EP | 0367154 A2 | 5/1990 |
|---|---|---|
| WO | WO0184468 A1 | 11/2001 |

OTHER PUBLICATIONS

Shieh et al., "Modified partical swarm optimization algorithm with simulated annealing behavior and its numerical verification", Elsevier, 2011, 19pg.*

*Primary Examiner* — Ryan D. Coyer

(74) *Attorney, Agent, or Firm* — Squire Patton Boggs (US) LLP

(57) ABSTRACT

According to an example embodiment of the present invention there is provided an apparatus comprising at least one processing core, at least one memory including computer program code, the at least one memory and the computer program code being configured to, with the at least one processing core, cause the apparatus at least to cause a first parameter value set comprising at least one first parameter value to be provided to a first set of devices, obtain a fitness value associated with the first parameter value set in the first set of devices, determine, based at least in part on the fitness value and an optimization algorithm, at least one second parameter value set comprising at least one second parameter value, and cause the at least one second parameter value set to be provided to the first set or a second set of devices.

17 Claims, 6 Drawing Sheets

(56) References Cited

U.S. PATENT DOCUMENTS

2007/0179919 A1* 8/2007 Kropaczek .......... G05B 13/024
  706/19
2008/0319558 A1 12/2008 Resende
2015/0127565 A1* 5/2015 Chevalier .............. G06Q 30/00
  705/319

* cited by examiner

PARAMETER MODIFICATION

FIELD OF INVENTION

The present invention relates to the field of parameter optimization, such as for example computer program or industrial process parameter optimization.

BACKGROUND OF INVENTION

Many industrial processes, computer programs and other processes can be run with a number of parameters that may accept different values. A process may accept one parameter, or more than one parameter. More complex processes may be configurable with a plurality of parameters, or parameter sets, which may comprise dozens or even a hundred parameters.

Where a set of parameters comprises at least one parameter, a process may be configured with a parameter value set comprising at least one corresponding parameter value. For example, where a parameter set comprises one temperature parameter, it may be configured with a parameter value set comprising one temperature value. In more complex examples, a parameter set may comprise, for example, two temperatures, an angular velocity, a viscosity and a time parameter. Such a parameter set may be configured, for example, with a parameter value set comprising two temperature values, an angular velocity value, a viscosity value, and a time value. An example of such a parameter value set is {45 C, 49 C, 0.2 radians/second, 1.2 Pascal*seconds, 3.1 seconds}, where C denotes the Celsius temperature unit. Sometimes, where a process is configured to accept parameter values in certain units, only the numerical values need to be communicated, in other words communicating the units may in some cases be omitted.

Optimizing a parameter value set may comprise, for example, manually providing a plurality of units performing a process with modified parameter values. For example, where a set of users uses a program on a corresponding plurality of devices, a subset of the devices may be provided with a single modified parameter value. After a delay of, for example, a day, a fitness value of the subset running with the modified parameter value may be assessed, and in case the fitness is seen as superior to a fitness of the unmodified devices, the modified parameter value may be configured to the unmodified devices to obtain therein the superior fitness. Configuring this kind of test may be done by hand, for example. Such optimization may be referred to as A/B testing, for example.

Fitness in terms of parameter optimization may be considered to represent a desirable outcome of a corresponding process. For example, in a chemical process a yield per day may be considered a meaningful measure of fitness, with higher yields considered superior to lower yields. In computer programs, a higher proportion or retained users may be considered superior to a lower proportion of retained users. In engines, a lower fuel consumption may be considered superior to a higher fuel consumption.

SUMMARY OF THE INVENTION

According to a first aspect of the present invention there is provided an apparatus comprising at least one processing core, at least one memory including computer program code, the at least one memory and the computer program code being configured to, with the at least one processing core, cause the apparatus at least to cause a first parameter value set comprising at least one first parameter value to be provided to a first set of devices, obtain a fitness value associated with the first parameter value set in the first set of devices, determine, based at least in part on the fitness value and an optimization algorithm, at least one second parameter value set comprising at least one second parameter value, and cause the at least one second parameter value set to be provided to the first set or a second set of devices.

Various embodiments of the first aspect may comprise at least one feature from the following bulleted list:
- the fitness value indicates at least one of a user retention rate, a measure of fuel consumption and an industrial process yield
- the optimization algorithm comprises at least one of an adaptive simulated annealing algorithm, a simulated annealing algorithm and an iterated local search algorithm
- the apparatus is further configured to select the optimization algorithm at least in part based on a number of devices comprised in the second set of devices
- the apparatus is further configured to determine the second set of devices based at least in part on at least one of the following: a geographic area, a device type, a number of parameters comprised in the second parameter value set and a type of at least one parameter value comprised in the second parameter value set
- the apparatus is configured to cause the first parameter value set to be provided to the first set of devices by causing transmission of the first parameter value set to at least one device of the first set of devices responsive to at least one request from the at least one device
- the apparatus is, responsive to determining, using the optimization algorithm, a preferred parameter value set, configured to cause the preferred parameter value set to be provided to a third set of devices
- the third set of devices comprises at least one of the first set and second set of devices
- the apparatus is configured to cause the first parameter value set to be provided to the first set of devices at least in part via a wireless data interface According to a second aspect of the present invention there is provided a method comprising causing a first parameter value set comprising at least one first parameter value to be provided to a first set of devices, obtaining a fitness value associated with the first parameter value set in the first set of devices, determining, based at least in part on the fitness value and an optimization algorithm, at least one second parameter value set comprising at least one second parameter value, and causing the at least one second parameter value set to be provided to the first set or a second set of devices.

Various embodiments of the second aspect may comprise at least one feature corresponding to a feature from the preceding bulleted list laid out in connection with the first aspect.

According to a third aspect of the present invention there is provided an apparatus comprising means for causing a first parameter value set comprising at least one first parameter value to be provided to a first set of devices, means for obtaining a fitness value associated with the first parameter value set in the first set of devices, means for determining, based at least in part on the fitness value and an optimization algorithm, at least one second parameter value set comprising at least one second parameter value, and means for causing the at least one second parameter value set to be provided to the first set or a second set of devices.

According to a fourth aspect of the present invention there is provided a non-transitory computer readable medium having stored thereon a set of computer readable instructions that, when executed by at least one processor, cause an apparatus to at least cause a first parameter value set comprising at least one first parameter value to be provided to a first set of devices, obtain a fitness value associated with the first parameter value set in the first set of devices, determine, based at least in part on the fitness value and an optimization algorithm, at least one second parameter value set comprising at least one second parameter value, and cause the at least one second parameter value set to be provided to the first set or a second set of devices.

INDUSTRIAL APPLICABILITY

At least some embodiments of the present invention find industrial applicability in optimizing parameters or parameter sets in industrial processes, such as internal combustion engines, chemical processes, isotopic enrichment devices and computer software configuration.

DETAILED DESCRIPTION OF EXAMPLE EMBODIMENTS

According to at least some embodiments of the present invention, an automated process may configure parameter values to live devices to adaptively seek improvement in operation of the devices, which may be configured to run chemical, physical or software processes, for example.

Figure 1:
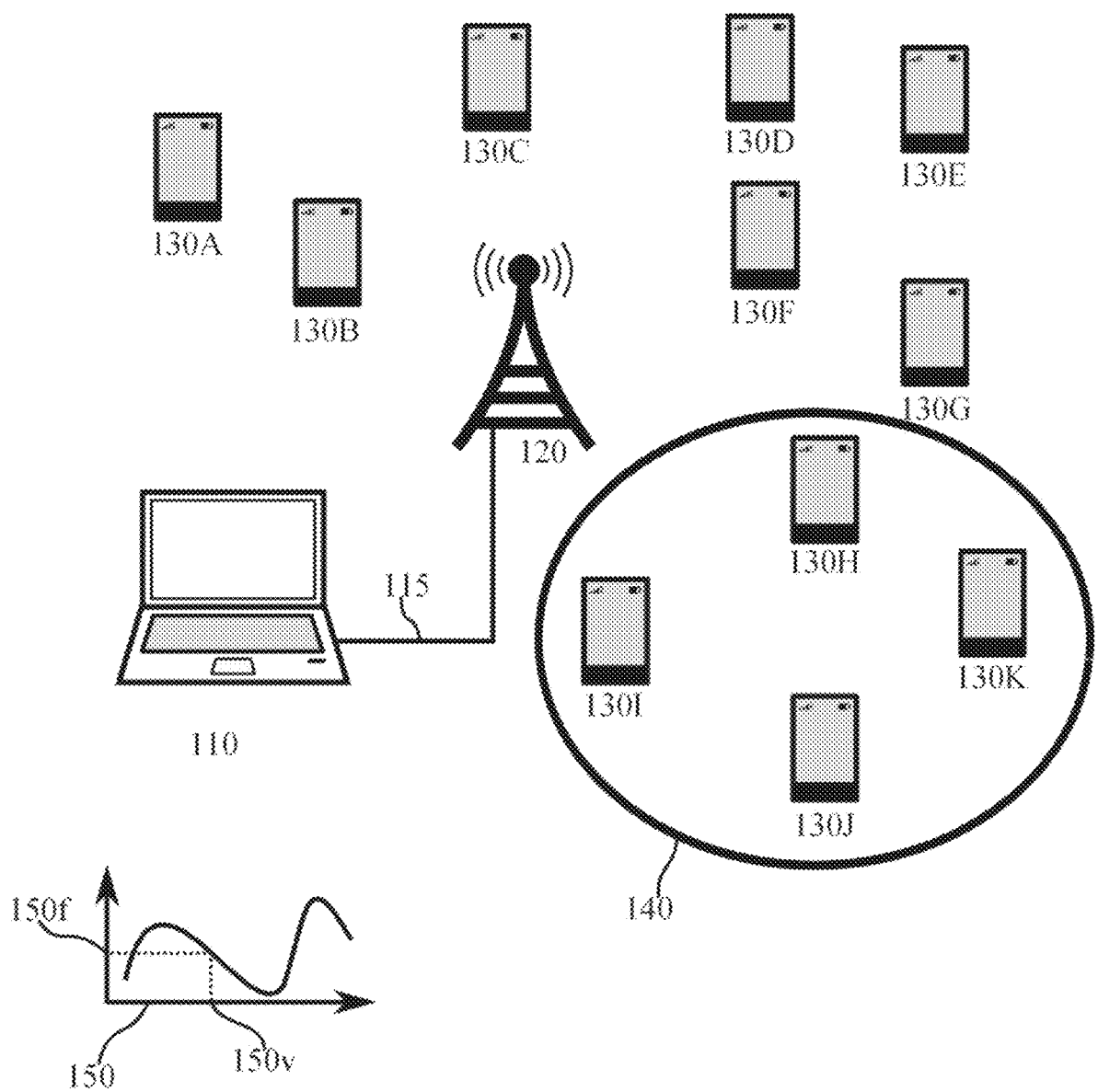
FIG. 1 illustrates an example system capable of supporting at least some embodiments of the present invention.

FIG. 1 illustrates an example system capable of supporting at least some embodiments of the present invention. Computer 110 may comprise, for example, a laptop computer, desktop computer, minicomputer, supercomputer or tablet computer or a plurality of at least two computers. Computer 110 may run software, stored on a memory internal to computer 110 or otherwise accessible to computer 110, on a processor comprised in computer 110.

Computer 110 is illustrated as being in communication with base station 120 via connection 115. Connection 115 may be wire-line or at least in part wireless. Connection 115 may traverse at least one node and/or network that are not illustrated in FIG. 1, for explaining the functioning of the present embodiments it is sufficient that computer 110 is capable of transmitting messages via connection 115 and of receiving messages via connection 115.

Base station 120 may comprise a cellular or non-cellular base station. A non-cellular base station may be referred to as an access point, but the term base station is used hereinafter for the sake of clarity. Base station 120 may be arranged to operate in accordance with a cellular communication standard, such as for example wideband code division multiple access, WCDMA, or long term evolution, LTE. Base station 120 may be arranged to operate in accordance with a non-cellular communication standard, such as for example wireless local area network, WLAN, also known as Wi-Fi, or worldwide interoperability for microwave access, WiMAX. Base station 120 may be configured to establish wireless links with mobile devices in accordance with any standard or standards base station 120 is arranged to operate in accordance with.

Base station 120 may be configured to control at least one cell. Base station 120 may be configured to control more than one cell, each of the cells being characterized by a cell coverage area. Overlapping cell coverage areas are possible in case the cells operate at different operating frequencies. Base station 120 may receive mobile units into cells it controls via handover procedures, in case the mobile units move into a cell coverage area of a cell controlled by base station 120.

Illustrated in FIG. 1 are mobile 130A, mobile 130B, mobile 130C, mobile 130D, mobile 130E, mobile 130F, mobile 130G, mobile 130H, mobile 130I, mobile 130J and mobile 130K. These mobiles may be referred to hereinafter as mobiles 130A-130K. The number of mobiles is not limited to the number of mobiles in FIG. 1, rather it may be higher, or alternatively lower, than in the illustrated set. Mobiles 130A-130K may communicate with computer 110 via base station 120 and connection 115. Wireless links between base station 120 and each of mobiles 130A-130K are not illustrated in FIG. 1 for the sake of clarity. In various embodiments, base station 120 may be seen as representing a communication network, or indeed even a global network of communication networks. In other words, mobiles 130A-130K need not be in the same cell, or under the control of the same base station. The arrangement of FIG. 1 has been selected merely to enable describing of principles at least some embodiments of the present invention.

Although illustrated as a system comprising base station 120 communicating with mobiles 130A-130K, the scope of the invention comprises any system capable of disseminating information to a plurality of devices running a process. For example, instead of mobiles 130A-130K, the system might comprise chemical reactors 130A-130K, or a fleet of automobiles 130A-130K. In the case of chemical reactors, a data bus arrangement at a chemical plant containing the chemical reactors might be used to communicate between computer 110 and the chemical reactors 130A-130K. In the case of a fleet of automobiles, a satellite data link might be used to communicate between computer 110 and the fleet of automobiles, for example.

In FIG. 1, each of mobiles 130A-130K is configured to run a process, such as for example an operating system or game. In the case of an operating system, fitness may be defined in terms of battery consumption of mobiles, where reduced consumption of battery power is seen as improved fitness. The set of mobiles 130A-130K may be defined as a subset of all mobiles, being defined, for example, as those mobiles that are reachable and actively running the process. Within mobiles 130A-130K is further defined a subset, or set, 140, which comprises mobile 130H, mobile 130I, mobile 130J and mobile 130K. The process running on each of mobiles 130A-130K may accept at least one parameter in running the process. In general set 140 may be considered to represent, for example, ten or twenty percent of mobiles 130A-130K. Computer 110 may be configured to search a parameter space spanned by the at least one parameter running in the process in each of mobiles 130A-130K, to identify a progressively more optimal parameter value set for the at least one parameter, where more optimal is seen as representing increased fitness.

Computer 110 may be configured to modify at least one parameter value comprised in a parameter value set running in the process running in each of the mobiles comprised in set 140. Assuming for the sake of simplicity that the at least one parameter comprises a single parameter, computer 110 may cause the value of the parameter in set 140 to be changed, leaving the corresponding parameter in mobiles 130A-130K not comprised in set 140 unchanged.

Subsequent to the change of parameter value in set 140, computer 110 may wait a predetermined time period, which may be for example one day, one week, a month or three months, and determine a fitness value associated with the changed parameter value in set 140. By comparing the fitness value from the changed parameter value in set 140 to a fitness value associated with the unmodified parameter value, computer 110 may determine whether the change caused an increase or a decrease in fitness, or whether the change had no effect on fitness. The fitness value associated with the unchanged parameter value may be obtained from mobiles 130A-130K not comprised in set 140, or from set 140 prior to causing the parameter value to be changed.

Graph 150, included in FIG. 1, illustrates how a fitness value may depend on a single parameter value in terms of a coordinate system. On the horizontal axis, the value of the parameter increases from left to right, and on the vertical axis the fitness increases from the bottom toward the top. The curve arranged in the illustrated coordinate system reflects an example of dependence of fitness on the parameter value. For example, according to the illustrated dependence of fitness on the parameter value, parameter value 150$v$ is associated with a fitness value 150$f$. In case parameter value 150$v$ is the unchanged parameter value and computer 110 selects 150$v+\varepsilon$ is the changed parameter value, $\varepsilon$ being a small positive value, we can deduce from graph 150 that the changed parameter value 150$v+\varepsilon$ would be associated with a smaller fitness value than the unchanged parameter value 150$v$, since the curve is declining from left to right at 150$v$.

The dependence of fitness on parameter values may not be known beforehand. Rather, a fitness value associated with a given parameter value set may be determined by configuring a plurality of devices with the given parameter value set and determining the fitness value by observation or report. For example, where the parameter value set is input to an isotopic enrichment centrifuge, the centrifuge may report back to computer 110 a rate of output of enriched isotope, which may be the fitness value, or from which computer 110 may be enabled to derive the fitness value. Where the fitness is defined in terms of user retention, in other words how persistently a user continues using a computer program, fitness may be derived by computer 110 from information it receives from mobiles 130A-130K, the information reflecting use of the program.

In embodiments where fitness is defined in terms of user actions, a parameter being varied may comprise at least one of an identifier of an animation and an identifier of a font used in connection with a selection, such as for example a selection used to prompt for permission to install or start an application. Fitness may in such a case depend, for example, on a number of clicks or program activations performed by users with presented with the selection in connection with the at least one of an animation and a font. By varying the animation and/or font, fitness can be optimized to maximize the number of clicks or program activations.

A parameter value set computer 110 caused to be configured on mobiles, or devices in general, may comprise one or more than one parameter. The parameters may be continuous or discontinuous in nature. For example, a parameter may accept a value between 2.0 and 5.0, in increments of 0.1. Another example of a parameter is one which accepts as value an integer selected from the interval $\{6, 122\}$. Another example of a parameter is one which accepts as input a colour, which may be employed in a user interface element, for example. Another example of a parameter is one which accepts as input a logical value, either yes or no. A set of parameters may comprise parameters of different types.

A parameter value set may comprise, for example, a value of a parameter comprising a colour of a user interface element, such as a colour of a button, and other parameters that take values different from colours. Such other parameters values may comprise at least one of a background music selection, a speed setting of an animation, languages used, at least one menu arrangement and a display luminosity setting.

Computer 110 may be configured to, responsive to being in receipt of the fitness value associated with the changed and the unchanged parameter value set, select a second changed parameter value set for configuration in a subset of mobiles, such as for example set 140 or another subset. In selecting the second changed parameter value set, computer 110 may employ an optimization algorithm. Using the optimization algorithm, computer 110 can search for a desired place in the parameter space spanned by the parameter set that is varied. In detail, computer 110 may select a new changed parameter value set based on at least one previous parameter value set and at least one fitness value corresponding to the at least one previous parameter value set.

The optimization algorithm may be selected by computer 110 in dependence on the parameter set to be varied. For example, where a single parameter of continuous nature is varied, a simple one-dimensional derivative-based search algorithm may be employed. In case the parameter set to be varied comprises more than one parameter, the number of dimensions in the optimization algorithm may be set to match the number of parameters to be varied. More generally, the optimization algorithm may comprise, for example, at least one of an adaptive simulated annealing algorithm, a simulated annealing algorithm and an iterated local search algorithm, or variants thereof.

Computer 110 may be configured to select set 140 in dependence of factors including geographic region, device type, language region, cultural region, financial income, or combinations thereof. In detail, computer 110 may be configured to optimize parameter sets separately for devices operating in Europe, South America, and Australia, for example. Optimal parameters may differ among geographic areas, for example due to differences in temperature, humidity, and consumer preferences. Likewise a parameter value set that is optimal when running a program on a tablet device may be less than optimal for running the same program on a smartphone, so separate optimizations for tablets and smartphones may be useful. Likewise an optimal set of parameter values for a device used by a low-income user may be less than optimal for a device used by a high-income user.

To cause a parameter value set to be changed in set 140, computer 110 may cause the changed parameter values to be pushed to mobiles comprised in set 140, or alternatively or additionally computer 110 may be configured to provide the changed parameter value set to each mobile separately upon request. For example, the mobiles may be configured to query computer 110, or another node, in connection with starting a process or program that the parameters to be varied relate to. The changed parameter value set may be provided as a response to such a query, so that the program or process is started with the changed parameter value set.

Figure 2:
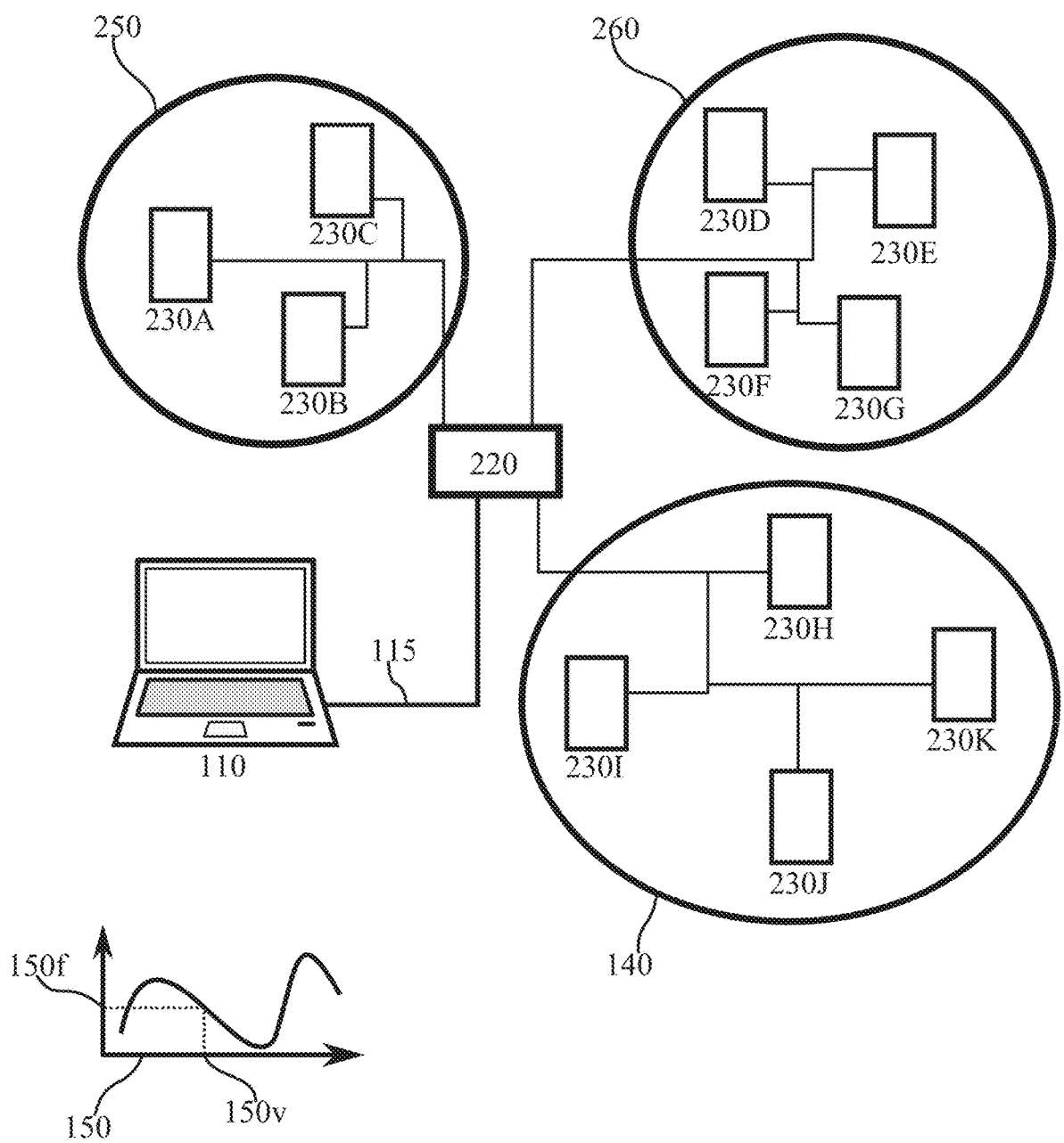
FIG. 2 illustrates an example system capable of supporting at least some embodiments of the present invention.

FIG. 2 illustrates an example system capable of supporting at least some embodiments of the present invention. The system illustrated in FIG. 2 is similar to that illustrated in FIG. 1, with the following differences: 1) instead of mobiles, devices 230A-230K are fixed industrial apparatuses, such as for example chemical reactors. As discussed above in connection with FIG. 1, the present disclosure is not limited to mobile devices. 2) Instead of base station 120, the system of FIG. 2 comprises a router 220 that is operationally enabled to communicate with each of devices 230A-230K using wire-line connections. 3) In addition to set 120, the system of FIG. 2 comprises set 250 and set 260.

In the system of FIG. 2, computer 110 may be configured to cause each of sets 140, 250 and 260 to be configured with different changed parameter value sets. This enables computer 110 to evaluate fitness values associated with three points in the parameter value space concurrently.

In general, computer 110 may be configured to cause a first set of devices to be configured with a first changed parameter value set, and a second set of devices to be configured with a second changed parameter value set, to concurrently determine a first fitness value associated with the first changed parameter value set and a second fitness value associated with the second changed parameter value set. In this connection, concurrently determining may comprise that the first and second changed parameter value sets are concurrently in use in the first and seconds sets of devices.

In general the systems of FIG. 1 or FIG. 2 may be described on a general level as a system where computer 110 has at its disposal a communication arrangement enabled to convey information from computer 110 to a plurality of devices running a process. The nature of the communication arrangement, the devices and the processes running in the devices all depend on the nature of the embodiment.

Figure 3:
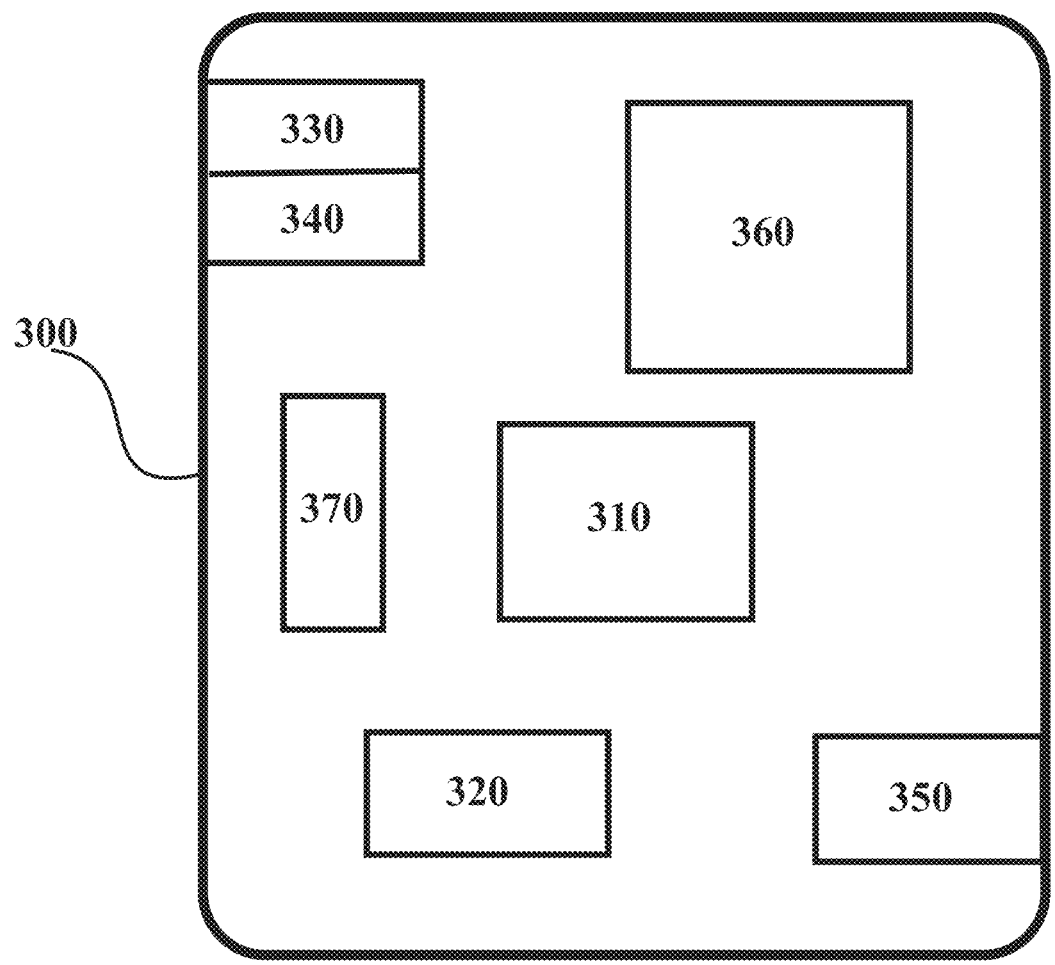
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as computer 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may comprise computer instructions that processor 310 is configured to execute. Memory 320 may be means for storing information.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
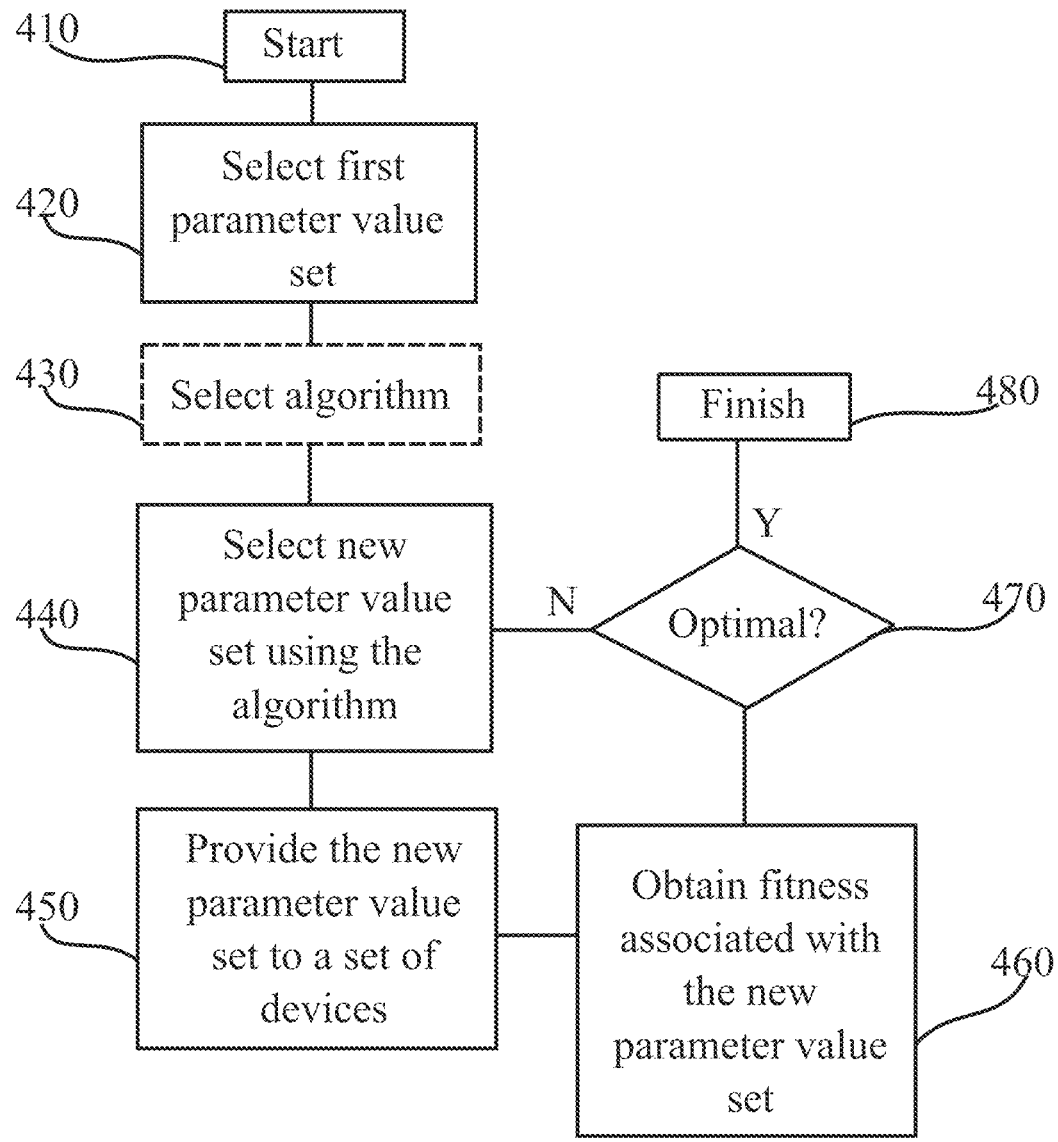
FIG. 4 is a first flow graph in accordance with at least some embodiments of the present invention.

FIG. 4 is a first flow graph in accordance with at least some embodiments of the present invention. The phases of the illustrated method may be performed in computer 110, or computer 110 may be configured to cause the phases to be performed.

The process of FIG. 4 begins in phase 410, and proceeds therefrom to phase 420. In phase 420, an initial point in the parameter space is selected. For example, the default parameter values of the parameters to be varied may be selected as the starting point. The default values may correspond to the values in use by mobiles 130A-130K of FIG. 1 or devices 230A-230K of FIG. 2, respectively, before variation is done.

Phase 430 comprises selection of an optimization algorithm. Phase 430 is optional and is absent in some embodiments. For example, where changing or selecting algorithm is unnecessary a default algorithm can be used instead of selecting one.

Phase 440 comprises employing the algorithm to select a new parameter value set, different from the first parameter value set. For example, at least one parameter value comprised in the first parameter value set may be varied slightly, in accordance with the algorithm, to produce the new parameter value set.

Phase 450 comprises providing, or causing to be provided, the new parameter value set to a set of devices, as described above in connection with FIG. 1 and FIG. 2.

Phase 460 comprises obtaining a fitness value associated with the new parameter value set, as described above in connection with FIG. 1 and FIG. 2.

Phase 470 comprises determining, based at least in part on the fitness value obtained in phase 460, whether the new parameter value set corresponds to an optimal point in parameter space. This determination may be based on the algorithm, which may comprise a stopping condition which is triggered based on internal dynamics of the algorithm when the algorithm determines that it is not possible or desirable to keep searching for more optimal parameter value sets. In the affirmative, processing proceeds to phase 480 where processing ends. In the negative, processing proceeds to phase 440.

Figure 5:
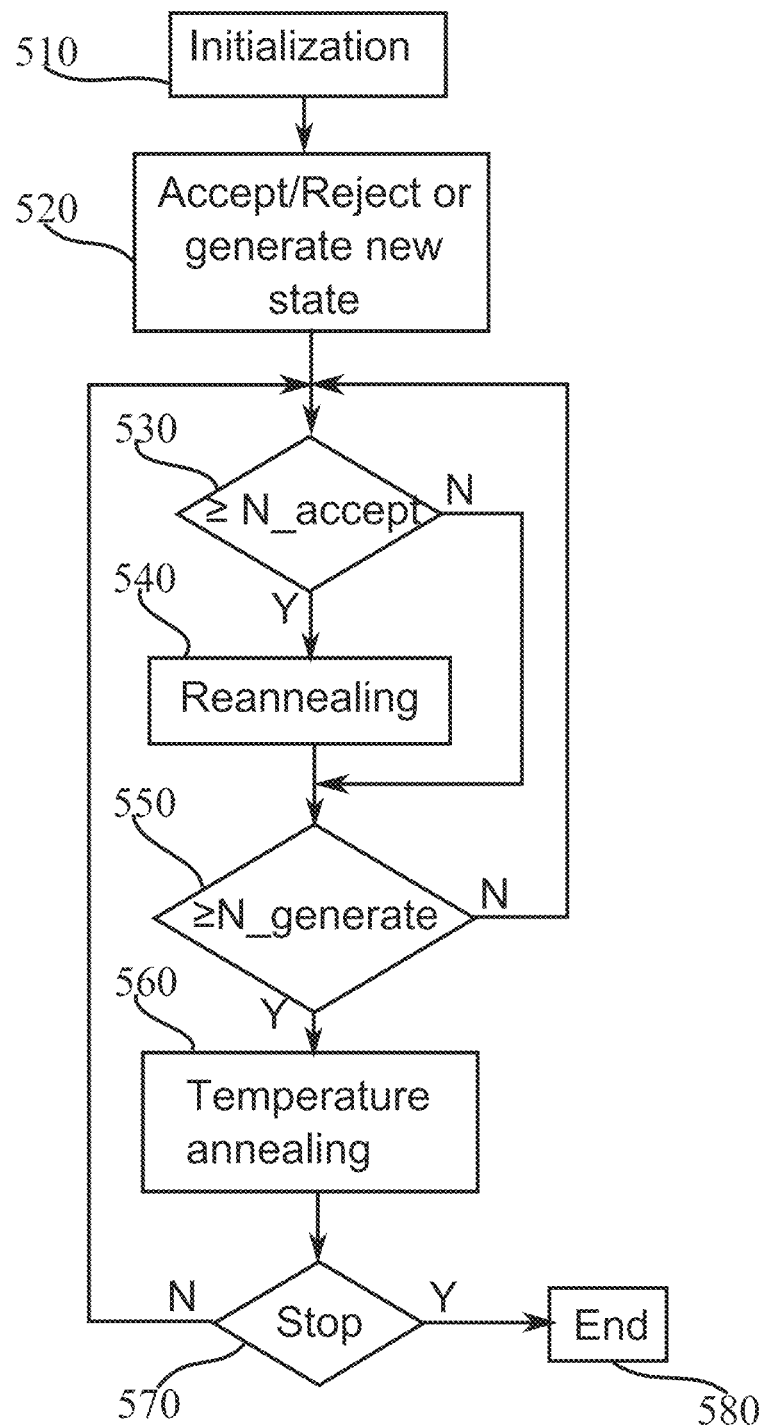
FIG. 5 is a second flow graph in accordance with at least some embodiments of the present invention.

FIG. 5 is a second flow graph in accordance with at least some embodiments of the present invention. FIG. 5 illustrates one example optimization algorithm, namely the adaptive simulated annealing, ASA, algorithm. Processing begins in phase 510, which comprises initialization of the algorithm. Initialization may comprise, for example, obtaining a starting point in the parameter space and/or obtaining information on mobiles or devices available for variation.

Processing advances from phase 510 to phase 520, which comprises which comprises of setting a random value to the selected parameter from the acceptable range of values and testing the fitness of the value with the given value. Values of the parameters may be defined as continuous numbers. Fitness is defined as a function of the parameters. A new parameter value is selected by random, first near the previous value, but if a better value is not found, the randomized selection will increase distance from the original value.

From phase 520, processing advances to phase 530 which comprises determining, whether N_accept needs to be incremented. The variable, or variables, N_Accept may store the current number of points saved by acceptance criteria, which may be used to monitor a fit of the algorithmic search to a fitness curve or membrane.

In case the determination of phase 530 results in a positive determination, processing advances from phase 530 to phase 540. Else, processing advances from phase 530 to phase 550.

Phase 540 comprise reannealing, which may comprise rescaling at least one parameter of the algorithm, such as for example an annealing time and/or an acceptance temperature.

From phase 540 processing advances to phase 550. N_generate may store a current number of generated states, which may be used to monitor a fit of the algorithmic search to a fitness curve or membrane.

In case the determination of phase 550 results in a positive determination, processing advances from phase 550 to phase 560. Else, processing advances from phase 530 to phase 540. Phase 560 comprises temperature annealing.

From phase 560 processing advances to phase 570, where it is determined whether a stop condition of the algorithm is satisfied. In case the stop condition is satisfied, processing advances to phase 580, where processing ends. In case the stop condition is not satisfied, processing advances from phase 570 to phase 530.

A more detailed description of an adaptive simulated annealing algorithm is provided in "Stochastic Global Optimization and its Applications with Fuzzy Adaptive Simulated Annealing", by Hime Aguiar e Oliveira Junior et al.

Figure 6:
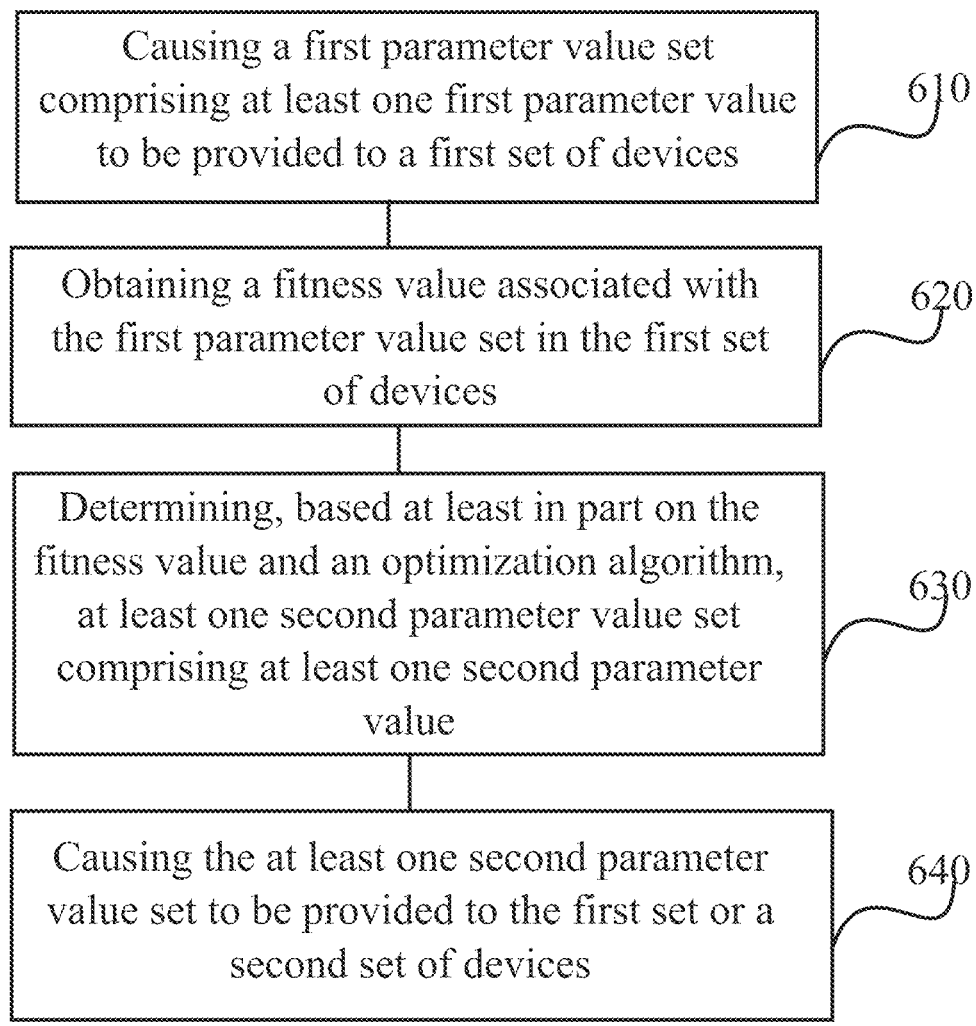
FIG. 6 is a third flow graph in accordance with at least some embodiments of the present invention.

FIG. 6 is a third flow graph in accordance with at least some embodiments of the present invention. The phases of the illustrated method may be performed in computer 110, for example. Phase 610 comprises causing a first parameter value set comprising at least one first parameter value to be provided to a first set of devices. Phase 620 comprises obtaining a fitness value associated with the first parameter value set in the first set of devices. Phase 630 comprises determining, based at least in part on the fitness value and an optimization algorithm, at least one second parameter value set comprising at least one second parameter value. Finally, phase 640 comprises causing the at least one second parameter value set to be provided to the first set or a second set of devices.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core and at least one memory including computer program code, the at least one memory and the computer program code being configured to, with the at least one processing core, cause the apparatus at least to:
   cause a first parameter value set comprising at least one randomly selected first parameter value to be provided to a first set of mobile communication devices, wherein the first set of mobile communication devices are provided with the same first parameter value set, wherein the at least one randomly selected first parameter value is within an acceptable range of values;
   obtain a fitness value associated with the first parameter value set in the first set of mobile communication devices, wherein the fitness value indicates a user retention rate;
   determine, based at least in part on the fitness value and an optimization algorithm, at least one second parameter value set comprising at least one second parameter value, and
   cause the at least one second parameter value set to be provided to the first set or a second set of mobile communication devices, wherein the apparatus is further caused to determine at least one of the first set or the second set of mobile communication devices based at least in part on at least one of the following: geographic region, mobile communication device type, language region, and cultural region.

2. The apparatus according to claim 1, wherein the optimization algorithm comprises at least one of an adaptive simulated annealing algorithm, a simulated annealing algorithm and an iterated local search algorithm.

3. The apparatus according to claim 1, wherein the apparatus is further configured to select the optimization algorithm at least in part based on a number of mobile communication devices comprised in the second set of mobile communication devices.

4. The apparatus according to claim 1, wherein the apparatus is further configured to determine the second set of mobile communication devices based at least in part on at least one of the following: a number of parameters comprised in the second parameter value set and a type of at least one parameter value comprised in the second parameter value set.

5. The apparatus according to claim 1, wherein the apparatus is configured to cause the first parameter value set to be provided to the first set of mobile communication devices by causing transmission of the first parameter value set to at least one mobile communication device of the first set of mobile communication devices responsive to at least one request from the at least one mobile communication device.

6. The apparatus according to claim 1, wherein the apparatus is, responsive to determining, using the optimization algorithm, a preferred parameter value set, configured to cause the preferred parameter value set to be provided to a third set of mobile communication devices.

7. The apparatus according to claim 6, wherein the third set of mobile communication devices comprises at least one of the first set and second set of mobile communication devices.

8. The apparatus according to claim 1, wherein the apparatus is configured to cause the first parameter value set to be provided to the first set of mobile communication devices at least in part via a wireless data interface.

9. A method comprising:
   causing a first parameter value set comprising at least one randomly selected first parameter value to be provided to a first set of mobile communication devices, wherein the first set of mobile communication devices are provided with the same first parameter value set, wherein the at least one randomly selected first parameter value is within an acceptable range of values;
   obtaining a fitness value associated with the first parameter value set in the first set of mobile communication devices, wherein the fitness value indicates a user retention rate;
   determining, based at least in part on the fitness value and an optimization algorithm, at least one second parameter value set comprising at least one second parameter value, and
   causing the at least one second parameter value set to be provided to the first set or a second set of mobile communication devices, wherein at least one of the first set or the second set of mobile communication devices is determined based at least in part on at least one of the following: geographic region, mobile communication device type, language region, and cultural region.

10. The method according to claim 9, wherein the optimization algorithm comprises at least one of an adaptive simulated annealing algorithm, a simulated annealing algorithm and an iterated local search algorithm.

11. The method according to claim 9, further comprising selecting the optimization algorithm at least in part based on a number of mobile communication devices comprised in the second set of mobile communication devices.

12. The method according claim 9, further comprising determining the second set of mobile communication devices based at least in part on at least one of the following: a number of parameters comprised in the second parameter value set and a type of at least one parameter value comprised in the second parameter value set.

13. The method according to claim 9, wherein causing the first parameter value set to be provided to the first set of mobile communication devices comprises causing transmission of the first parameter value set to at least one mobile communication device of the first set of mobile communication devices responsive to at least one request from the at least one mobile communication device.

14. The method according to claim 9, comprising causing a preferred parameter value set to be provided to a third set of mobile communication devices responsive to determining, using the optimization algorithm, the preferred parameter value set.

15. The method according to claim 14, wherein the third set of mobile communication devices comprises at least one of the first set and second set of mobile communication devices.

16. The method according claim 9, comprising causing the first parameter value set to be provided to the first set of mobile communication devices at least in part via a wireless data interface.

17. A non-transitory computer readable medium having stored thereon a set of computer readable instructions that, when executed by at least one processor, cause an apparatus to at least:

cause a first parameter value set comprising at least one randomly selected first parameter value to be provided to a first set of mobile communication devices, wherein the first set of mobile communication devices are provided with the same first parameter value set, wherein the at least one randomly selected first parameter value is within an acceptable range of values;

obtain a fitness value associated with the first parameter value set in the first set of mobile communication devices, wherein the fitness value indicates a user retention rate;

determine, based at least in part on the fitness value and an optimization algorithm, at least one second parameter value set comprising at least one second parameter value, and cause the at least one second parameter value set to be provided to the first set or a second set of mobile communication devices, wherein the apparatus is further caused to determine at least one of the first set or the second set of mobile communication devices based at least in part on at least one of the following: geographic region, mobile communication device type, language region, and cultural region.

* * * * *